DATA SELECTING AND REPRODUCING APPARATUS

Filed Oct. 19, 1953 2 Sheets-Sheet 1

INVENTOR
Frank R. Eldridge, Jr.

BY Donald E. Lane
ATTORNEY

April 29, 1958 F. R. ELDRIDGE, JR 2,832,841

DATA SELECTING AND REPRODUCING APPARATUS

Filed Oct. 19, 1953 2 Sheets-Sheet 2

INVENTOR
Frank R. Eldridge, Jr

BY Donald E. Lane
ATTORNEY 2,832,841
Patented Apr. 29, 1958

2,832,841

DATA SELECTING AND REPRODUCING APPARATUS

Frank R. Eldridge, Jr., Baltimore, Md., assignor of one-half to Edward H. Kornhauser, New York, N. Y.

Application October 19, 1953, Serial No. 386,833

11 Claims. (Cl. 179—100.2)

This invention relates to data transmission and more particularly to electro-mechanical apparatus for selecting recorded data for audible reproduction in accordance with transmitted pulses.

It is known that intelligence data of the character transmitted by radio to aircraft pilots, for example, is composed of a relatively small number of words and/or numbers. The data may be weather information, landing or flight instructions, attack intelligence or orders, or the like. Ordinarily such data is transmitted by voice radio utilizing conventional or code words. Voice radio requires a relatively wideband radio transmission and is easily misunderstood or jammed under certain circumstances.

It is an object of this invention to provide electro-mechanical apparatus including recorded words, numbers, or phrases and including selection devices controlled by transmitted pulses to control the audible reproduction of selected words, numbers, or phrases.

It is another object of this invention to provide an audible data apparatus which is remotely controlled by combinations of pulses to reproduce selected data audibly.

It is another object of this invention to provide a compact data reproducer and data selection apparatus suitable for installation in aircraft and in other forms of transportation vehicles.

It is a further object of this invention to provide an audible data apparatus capable of selecting and reproducing any of sixty-four recorded words, phrases or numbers in response to a remote transmission of groups of six pulses, and in which the number of recorded items available for selection may be doubled by addition of another pulse to the pulse group.

It is a further object of this invention to provide an audible data apparatus which may be remotely controlled by radio, telegraph, teletype, or any form of pulse transmission.

Other objects and advantages of this invention will be readily apparent to those skilled in the art of data transmission by examination of the following description and the accompanying drawings illustrating a preferred embodiment of the invention, wherein.

Figure 1:
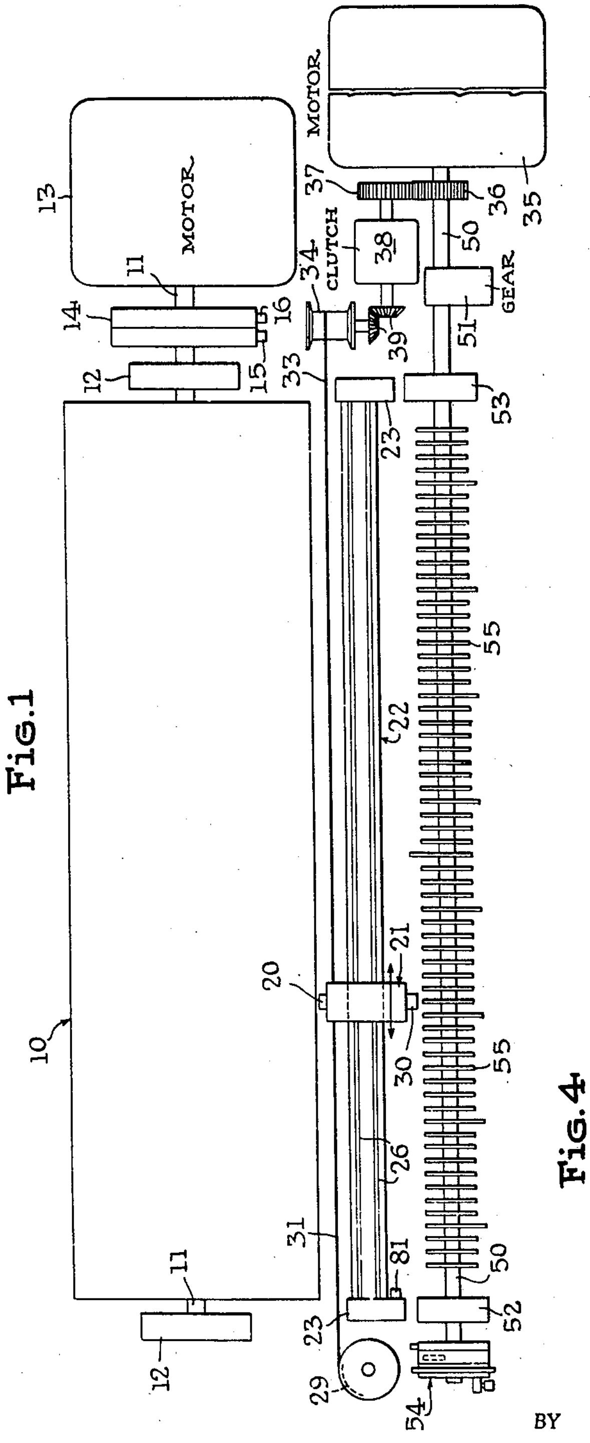
Figure 1 is a diagrammatic elevational view of a magnetic drum type data storage device with selecting mechanisms for positioning a pick-up device lengthwise along said drum.

Referring now to Figure 1 of the drawings, a magnetic record drum is designated by the numeral 10. The drum 10 is supported on a shaft 11 carried in supporting bearings 12. The shaft 11 is connected to an electric motor 13 for rotating the drum 10. A cam wheel 14 is carried by the drum shaft 11 and is provided with two cams 15 and 16 for operating electrical switches hereinafter described. The drum 10 may be made of magnetic material, or may have a surface of magnetic material of the same type utilized in making tape or disc magnetic records. Other types of recordings including mechanical and/or optical recordings may be utilized along with proper pick-up devices therefor. The drum 10 has a plurality of parallel sound tracks extending around the periphery of the drum surface, and each track may be a recording of a word, a phrase, or a number or numbers. The illustrated apparatus embodying this invention is intended for a drum 10 having a total of sixty-four spaced sound tracks therealong. The number of sound tracks may be more or less than sixty-four, and the selecting mechanism shown and described is controlled by groups of six pulses. If groups of seven pulses are utilized, the apparatus may include one hundred and twenty-eight sound tracks. Each additional pulse in the group doubles the number of sound tracks for selection.

Figure 4:
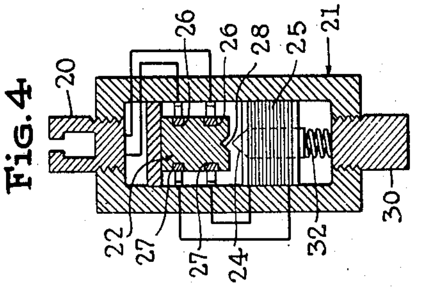
Figure 4 is an enlarged diagrammatic view, partly in section, of the pick-up device shown in Figure 1.

A conventional magnetic pick-up device is designated by the numeral 20. The pick-up 20 is carried by a slidable carriage 21 supported by a bar 22. The bar 22 is rigidly secured by supports 23 in a position parallel to the shaft 11, so that the carriage 21 may slide along the bar 22 to position the pick-up 20 adjacent to any selected one of the plurality of sound tracks on the drum 10. The carriage 21 is provided with a brake 24 operated by a spring 32 to lock the carriage against sliding movement along the bar 22. The brake 24 is released by energization of a solenoid 25. The bar 22 is preferably made from insulating material and is provided on opposite sides with conductive strips or bars, there being a pair designated by the numeral 26 on one side, and another pair designated by the numeral 27 on the other side. The magnetic pick-up head 20 is connected to spring contacts which engage bars 26. The solenoid coil 25 is connected to spring contacts which engage bars 27. The bar may be of rectangular cross-section as shown in Figure 4, and may have a longitudinal groove 28 on the lower side to be engaged by the brake shoe 24. The pick-up carriage 21 is provided with a depending lug 30 for engagement with stop devices hereinafter described.

The carriage 21 is adapted to slide in either direction along the fixed bar 22, and is connected by a flexible tape or cord 31 to a tensioned coil spring 29 at the left-hand end of bar 22. The spring 29 tends to pull the carriage 21 toward the left to the left bar support member 23. A second tape or flexible cord 33 extends from the carrier 21 to a wind-up drum 34 at the right-hand end of bar 22. The drum 34 is motor driven to wind up the tape 33 and pull the carrier 21 to the right along the bar 22. The force applied by the winding drum 34, when driven, is adequate to overcome the tension of coil spring 29. The wind-up drum 34 is driven by a motor 35 through gears 36 and 37, a solenoid-controlled slip clutch 38, and bevel gears 39. The slip clutch 38 may be of the friction or fluid drive type and includes a solenoid operated release for disconnecting the slip drive completely when it is desired that the pick-up carriage 21 be pulled to the left end of the bar 22 by the coiled spring 29 and tape 31.

The apparatus for determining the longitudinal positioning of the pick-up carrier 21 includes a horizontal shaft 50 driven by the motor 35 through a reduction gear 51. The shaft 50 is supported in bearings 52 and 53, and is provided on its left end with a triple cam wheel 54 for actuating switches hereinafter described. The shaft 50 is parallel to the bar 22. A series of discs 55 are rigidly secured to the shaft 50 in spaced relation and are rotated together as one group when the shaft is turned by the motor 35. The discs 55 are provided with projecting tabs 56, as shown best in diagrammatic form in Figure 2. Each disc 55 has one tab 56, and the circumferential extent of each tab approximates one-seventh of a circle, or approximately fifty-one degrees. As shown in Figure 1, the preferred embodiment includes sixty-four discs 55. The tabs 56 project a distance from the shaft 50 enough to be engaged by the depending lug 30 of the carriage 21 when a disc 55 is positioned with its tab 56 projecting upward into the lateral path of travel of the lug 30. The discs 55 are secured to the shaft 50 so that the tab 56 on each disc 55 is accurately positioned with respect to the tabs on other discs and with respect to the cam wheel 54. In a diagrammatic showing in Figure 2, cam wheel 54 is shown with markings dividing the periphery into seven equal segments designated A, B, C, D, E, F, and R. The center disc 55 of the sixty-four disc series, that is disc #32 has its tab 56 in alinement with segment A. Discs #16 and #48 of the series have a tab in alinement with segment B. Discs #8, #24, #40, and #56 of the series have a tab in alinement with segment C. Discs #4, #12, #20, #28, #36, #44, #52, and #60 of the series have a tab in alinement with segment D. All other even number discs have a tab in alinement with segment E, and all odd number discs of the series have a tab in alinement with segment F. None of the sixty-four discs 55 of the series has a tab 56 in alinement with segment R, since R is the reset segment permitting the carrier 21 to be moved freely back to its reset or start position at the left end of bar 22.

Figure 2:
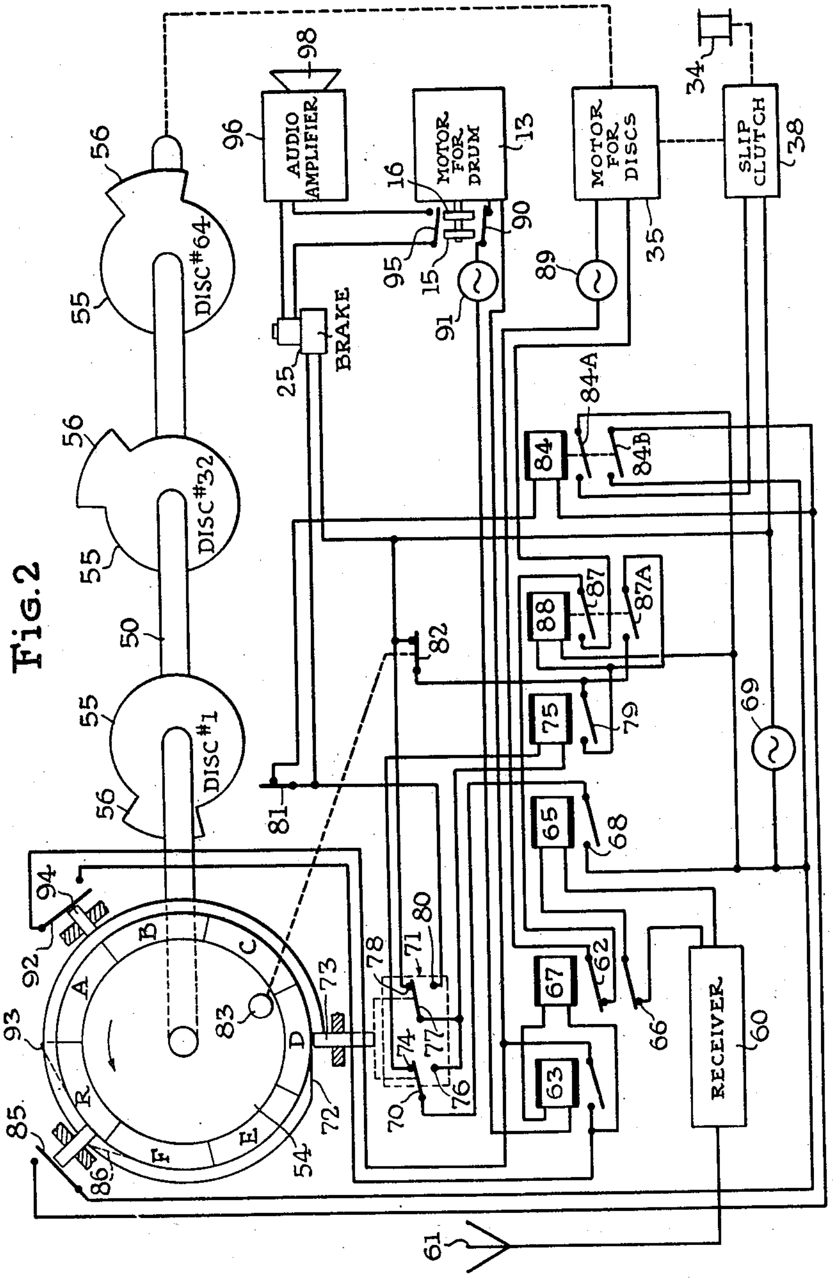
Figure 2 is a diagrammatic view of electrical devices and circuits for use in operating the mechanisms shown in Figure 1.
Figure 3:
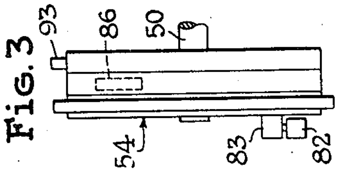
Figure 3 is an edgewise elevation of the cam wheel shown in Figure 2.

Referring now to Figure 2 and particularly to the circuit diagram illustrated therein, a radio receiver is designated by the numeral 60. The receiver is connected to an antenna 61, and is adapted to receive narrow band pulses from a remote radio transmitter. The output of the receiver is connected to the coil of solenoid switch 65 through the normally-closed contacts 66 of solenoid switch 67. The contacts 68 of solenoid switch 65 are normally open and are closed each time a pulse is received from receiver 60 to energize the solenoid 65. The contacts 68 are connected to a source 69 of electrical energy and to arm 70 of a cam-operated double-pole double-throw switch 71. The switch 71 is operated by cam 72 on the cam wheel 54 by means of a cam-follower 73. One contact 74 engaged by the switch arm 70 is connected to the coil of solenoid switch 75, and the other contact 76 is connected to the other side of said coil and to the arm 77 of switch 71. The upper contact 78 engaged by switch arm 77 is connected through a normally closed switch 82 to switch 79 operated by the solenoid 75 and to the source 69 of electrical energy. The switch 82 is adapted to be opened by a pin 83 projecting from the face of the cam wheel 54. The lower contact 80 engaged by switch arm 77 is connected to a switch 81 mounted on the left support 23, and switch 81 is opened only when the pick-up carrier 21 reaches its start position at the left end of bar 22. The contact 80 of switch 71 is also connected to the coil 25 of the brake mechanism, the connection being made through one of the conductive strips 27 on bar 22. The other contact of switch 81 is connected to the coil of the holding switch 84. The other side of coil 25 of the brake mechanism is connected through the other strip 27 to the source of energy 69. The other side of the coil of holding switch 84 is also connected to the source of energy 69, but is connected through a cam-operated switch 85 operated by a cam 86 on the cam wheel 54. The switch 84 is connected to control the slip clutch 38 which is connected through contact 84A to the source of electrical energy 69. The slip clutch may be of any conventional type, and is adapted to be fully disengaged when the solenoid switch 84 is energized and contact 84A closed. The solenoid 84 also operates to close contacts 84B connected across the cam-operated switch 85.

A switch 62 operated by solenoid 67 is connected in series with a switch 87 operated by solenoid 88 and in series with a source 89 of electrical energy for controlling the operation of motor 35. The motor 35 rotates the shaft 50 and operates the winding drum 34 through slip clutch 38. The solenoid 75 operates switch 79 which latter is connected in series with switch 82, with the solenoid coil 88 and with the energy source 69. Contact 87A also operated by the coil 88 is connected across switch 79 to hold the coil 88 energized after switch 79 opens.

The motor 13 which drives the drum 10 is connected in series with a cam-operated switch 90, a source 91 of electrical energy, the solenoid coils 63 and 67, and a second cam-operated switch 92. The switch 92 is actuated by cam 93 on cam wheel 54 acting through a cam follower 94. The switch 90 is operated by the cam 15. Another cam-operated switch 95 operated by the cam 16 on the shaft of motor 13 is connected in series with the magnetic pick-up device 20 through strips 26 on bar 22 and with an audio amplifier 96. The amplifier 96 is connected to feed a loud speaker 98 or headphones.

Figure 5:
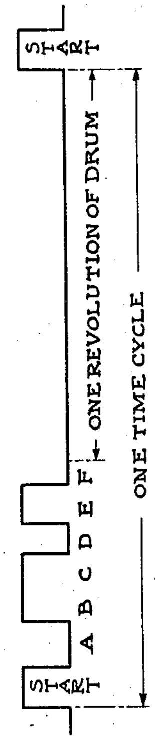
Figure 5 is a diagrammatic view of a typical time cycle of a pulse transmission for operating the apparatus shown best in Figure 2.

The operation of the apparatus described above will now be given. Assume that the apparatus illustrated and described is located in an aircraft and that the drum 10 has recorded thereon a plurality of sound tracks extending circumferentially around the drum. Each track is a recorded word, number, or phase. A remote station, not shown, desires to reproduce in said aircraft a certain selection or sequence of words, numbers or phrases. The remote station transmits via radio on a narrow wave band, to which receiver 60 is tuned, a series of simple pulses which cause the apparatus illustrated to select and reproduce any one of the plurality of recordings. For example, the transmission of pulses may be as shown in Figure 5 illustrating one typical time cycle. The time cycle includes a start baud followed by six bauds A to F inclusive, followed by an interval during which the drum 10 makes one complete revolution. The existence or nonexistence of a transmitted pulse in each of the six bauds A to F inclusive is utilized to operate the selection mechanisms so as to locate the pick-up device 20 adjacent any one of sixty-four different recordings.

When the apparatus is in the non-operating or start position, the carriage 21 and pick-up device 20 is at the extreme left end of bar 22, and all circuits are deenergized except the receiver 60. A start pulse on the narrow band to which the receiver 60 is tuned, is amplified by the receiver 60 and energizes the solenoid 65, since switch 66 is normally closed. Solenoid 65 closes switch 68 which energizes solenoid 75, switch arms 70 and 77 being in the position illustrated. Solenoid 75 closes switch 79 which energizes solenoid 88, and the latter closes switch 87 which starts operation of the motor 35. Switch 87A locks switch 87 in the contact position after solenoid 75 is deenergized. The motor 35 rotates shaft 50 through gears 51, and shaft 50 rotates the discs 55 and the cam wheel 54 attached to shaft 50. When cam wheel 54 is rotated to bring sector A in the top position, cam 72 actuates switch 71 through follower 73. This actuation moves switch arm 70 from contact 74 to contact 76, and moves switch arm 77 from contact 78 to contact 80. The switch actuation deenergizes solenoid 75 and connects brake solenoid 25 in series with switch 68 and the source of energy 69. This makes it possible for the switch 68 to release the carriage brake 24 whenever additional pulses are received during the selection cycle. When solenoid 75 is deenergized, the solenoid 88 remains energized through contacts 87A, thereby maintaining contacts 87 closed so that motor 35 continues to run through its cycle.

For baud sector A, only the center disc #32 has a tab 56 in the A sector. If no pulse is received during the time it takes for shaft 50 to rotate through sector A, the pick-up carriage 21 will remain at the extreme left end of bar 22. If, on the other hand, a pulse is received during the time shaft 50 is turning with lug 30 located in sector A, the brake solenoid 25 is energized, the brake 24 is released, and the carriage 21 will be pulled to the right by tape 33 until the carriage is stopped by engagement of the lug 30 with the projecting tab 56 of center disc #32. In the second or B sector, the disc tabs 56 are arranged so that the carriage 21 may move only one fourth of the length of the bar 50 from its previous position if a pulse is received. Similarly, the disc tabs in the third or C sector are arranged to permit the carriage to move one eighth of the total length of the bar 50 if a pulse is received during movement of the disc bar 50 in the C sector. In the fourth or D sector, in the fifth or E sector, and in the sixth or F sector, the disc tabs are arranged to permit the carriage to move one sixteenth, one thirty-second, and one sixty-fourth of the bar length, respectively, if pulses are received during any of said sectors. This arrangement of disc tabs 56 serves to locate the carriage 21 in any one of sixty-four positions along the drum 10 in accordance with a transmitted sequence of six bauds received after the starting pulse. A typical sequence of bauds is illustrated in the time cycle diagram of Figure 5, wherein there is shown a start pulse followed by no pulse in sector A, pulses in sectors B and C, no pulse in sector D, and a pulse in sector E, and no pulse in sector F. Such a sequence of bauds would serve to position the carriage 21 at disc #26 opposite to a sound track of that number on the data drum 10.

At the end of rotary movement of bar 50 in sector F, the switch 92 is closed by cam 93 and energizes the motor 13 which rotates drum 10. Energization of the motor circuit actuates the holding solenoid 63 which closes a switch connected in parallel with the switch 92 and also energizes the solenoid 67 which in turn opens switches 66 and 62 which, respectively, disconnect the receiver 60 and deenergize the motor 35. The holding solenoid switch 63 remains closed until switch 90, normally closed, is opened by cam 15 on the cam wheel 14 of drum motor 13. The cam 15 permits one full revolution of the drum 10 and then opens switch 90 momentarily which causes solenoid 67 to be deenergized, thereby permitting switches 66 and 62 to close. Switch 66 connects the receiver 60 to solenoid 65, and switch 62 is in the power circuit for motor 35. While the drum 10 is rotating through one revolution, the cam 16 maintains the switch 95 in a closed position thereby connecting the pick-up device 20 to an audio amplifier 96 having a speaker 98. The selected word, number, or phrase recorded on one track on the drum 10 is thereby reproduced audibly. After one revolution of drum 10, switch 95 is opened and the amplifier 96 disconnected from the pick-up 20. The cam 15 then opens switch 90 momentarily, as mentioned above, to deenergize the power circuit to motor 13 by causing the switch controlled by solenoid 63 to open. The solenoid 67 is deenergized by the opening of switch 63 thereby closing switches 62 and 66. When switch 62 closes, the disc shaft 50 starts turning in the reset sector R, and, while turning, the cam 86 on cam wheel 54 closes the switch 85 to energize the solenoid switch 84 which in turn energizes the slip clutch 38 thereby disengaging the clutch. The solenoid 84 is held energized by switch 84B connected in parallel with switch 85. The actuation of switch 85 also serves to energize the brake solenoid 25 to release the brake 24 and permit the spring 29 to pull the carriage 21 back to the left end of bar 22 to the start position. When it reaches the start position, the carriage opens switch 81 thereby deenergizing solenoid switch 84 which opens and causes the slip clutch 38 to become engaged and operative. When the turning shaft 50 reaches the end of the reset sector R, the notch in the cam 72 permits the follower 73 to be biased upward to return the switch 71 to the start position illustrated. Just before the cam wheel 54 reaches the reset or start position illustrated, the pin 83 momentarily opens the normally closed switch 82 and thereby deenergizes the holding solenoid switch 88 and stops the disc motor 35. The apparatus is then ready for receiving another start pulse to initiate a new time cycle for selecting and reproducing audibly any selected data recorded on the drum 10.

It will be obvious that the apparatus and circuits illustrated and described may be assembled in a compact light-weight unit for installation in aircraft. Since the selection device is entirely controlled by pulses, the radio transmitted pulses require only a narrow transmission band, and are effective to prevent unauthorized receivers from securing knowledge of the data reproduced and are relatively secure against jamming.

It will also be obvious to those skilled in the art that many changes and variations in the preferred form of apparatus and circuits illustrated may be made within the scope of this invention as defined in the following claims.

I claim:

1. In apparatus for selecting recorded data, the combination comprising, a data storage member including a plurality of tracks for recorded data, a data pick-up device, a carrier for said pick-up device movable to position said pick-up device at a desired data track, a motor for moving said carrier, a plurality of stops movable into and out of the path of movement of said carrier, drive means connected to said motor for moving said stops, a motor for moving said storage member, a source of energy for said motors, and baud-controlled means for connecting said motors to said source.

2. In apparatus for selecting recorded data, the combination comprising, a data storage member including a plurality of magnetic sound tracks, a magnetic pick-up device, a carrier for said pick-up device movable to position said pick-up device adjacent to a desired magnetic sound track, a motor for moving said carrier, a plurality of stops movable into and out of the path of movement of said carrier, drive means connected to said motor for moving said stops, a motor for moving said storage member, a sourse of energy for said motors, and baud-controlled means for connecting said motors to said source.

3. In apparatus for selecting recorded data, the combination comprising, a data storage member including a plurality of tracks for recorded data, a data pick-up device, a carrier for said pick-up device movable to position said pick-up device at a desired data track, a motor for moving said carrier, a shaft mounted parallel to the path of movement of said carrier, a plurality of members mounted in spaced relation along said shaft, said members having projecting tab portions engageable by said carrier, drive means connected to said motor for turning said shaft, a motor for moving said storage member, a source of energy for said motors, and baud-controlled means for connecting said motors to said source to move said pick-up device to a desired recorded data track.

4. In apparatus for selecting recorded data, the combination including, a rotatable drum having a plurality of circumferential sound tracks for magnetically-recorded data, a magnetic pick-up device, a carrier for said pick-up device movable along a path parallel to the axis of said drum to position said magnetic pick-up device at a desired circumferential sound track, a motor for rotating said drum, a motor for moving said carrier, a plurality of stops movable into and out of the path of movement of said carrier, drive means connected to said motor for moving said stops, a source of energy for said motors, and baud-controlled means for connecting said motors to said source.

5. In apparatus for selecting and reproducing recorded data, the combination comprising, a data storage member including a plurality of sound tracks for recorded data, a data pick-up device, a carrier for said pick-up device movable to position said pick-up device at a desired sound track, a motor for moving said carrier, a plurality of stops movable into and out of the path of movement of said carrier, drive means connected to said motor for moving said stops, a motor for moving said data storage member, a source of energy for said motors, means controlled by pulses for connecting said motors to said source, an amplifier connected to said pick-up device, and a reproducer connected to said amplifier.

6. Apparatus for selecting and reproducing recorded data in response to transmitted pulses, said apparatus comprising in combination, a data storage member including a plurality of sound tracks for recorded data, a data pick-up device, a carrier for said pick-up device movable to position said pick-up device at a desired sound track, a motor for moving said carrier, a plurality of stops movable into and out of the path of movement of said carrier, drive means connected to said motor for moving said stops, a motor for moving said data storage member, a source of energy for said motors, a reproducer connected to said pick-up device, and a series of pulse-controlled relays for connecting said motors to said source of energy.

7. Apparatus for selecting and reproducing recorded data in response to transmitted pulses, said apparatus comprising in combination, a rotatable drum having a plurality of circumferential magnetic sound tracks, a magnetic pick-up device, a carrier for said pick-up device movable along a path parallel to the axis of said drum to position said pick-up device at a desired sound track, a motor for rotating said drum, a motor and a slip clutch for moving said carrier, a rotatable shaft parallel to the axis of said drum, a plurality of stop members secured to said shaft and having projecting tabs engageable by said carrier to stop movement of said carrier, drive means connected to said second motor for turning said shaft, a source of energy for said motors, a reproducer connected to said pick-up device, and a series of pulse-controlled relay switches and holding switches for connecting said motors to said source of energy.

8. In apparatus for selecting recorded data, the combination including, a rotatable drum having a plurality of circumferential sound tracks thereon, a pick-up device, a carrier for said pick-up device movable along a path parallel to the axis of said drum, a rotatable shaft parallel to the path of movement of said carrier, a series of stop members secured to said shaft in spaced relation, each of said stop members having a tab projecting from the periphery thereof into the path of movement of said carrier, the tab on each said stop member projecting in a different angular direction than the tab on each adjacent stop member, motor means for turning said shaft and for moving said carrier against one of said tabs, whereby turning said shaft successively to predetermined positions stops said carrier with said pick-up device at a preselected sound track.

9. In apparatus of the character defined in claim 4, a rigidly supported bar on which said carrier is movable, a solenoid-operated brake on said carrier to hold said carrier in a selected position on said bar, and resilient means for biasing said carrier toward one end of said bar.

10. In apparatus of the character defined in claim 7, cam-operated switches associated with said rotatable drum, and cam-operated switches associated with said rotatable shaft, said switches being connected with said relay and holding switches to control the duration of operation of said motors.

11. Apparatus for selecting and reproducing recorded data in response to a sequence of bauds, said apparatus comprising in combination, a data storage member having a plurality of sound tracks thereon, a pick-up device, a carrier for said pick-up device movable to position said pick-up device at a selected sound track, motors for moving said storage member and said carrier, a plurality of stop members movable into and out of said path of movement of said carrier, means connected to one of said motors for moving said stop members, a source of energy for said motors, a series of baud-controlled relays and holding switches connected to said motors and said source of energy, and reproducing means connected to said pick-up device.

References Cited in the file of this patent

UNITED STATES PATENTS

| | | |
|---|---|---|
| 2,080,100 | Tauschek | May 11, 1937 |
| 2,168,326 | Collins | Aug. 8, 1939 |
| 2,416,445 | Jensen | Feb. 25, 1947 |